US012506729B2

(12) United States Patent
Alon et al.

(10) Patent No.: US 12,506,729 B2
(45) Date of Patent: Dec. 23, 2025

(54) DETECTING CREDENTIALS ABUSE OF CLOUD COMPUTE SERVICES

(71) Applicant: PALO ALTO NETWORKS (ISRAEL ANALYTICS) LTD., Tel Aviv (IL)

(72) Inventors: Dror Alon, Beer Yaakov (IL); Niv Sela, Tel Aviv-Jaffa (IL); Or Kliger, Tel Aviv (IL); Guy Arazi, Rosh Haayin (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 514 days.

(21) Appl. No.: 17/844,097

(22) Filed: Jun. 20, 2022

(65) Prior Publication Data
US 2023/0412588 A1 Dec. 21, 2023

(51) Int. Cl.
*H04L 9/40* (2022.01)

(52) U.S. Cl.
CPC ........ *H04L 63/083* (2013.01); *H04L 63/1425* (2013.01)

(58) Field of Classification Search
CPC ............... H04L 63/083; H04L 63/1425; H04L 63/1416; H04L 63/20; H04L 9/40
See application file for complete search history.

(56) References Cited

U.S. PATENT DOCUMENTS 8,146,146 B1 * 3/2012 Coviello ............. H04L 63/1416
726/11
8,245,304 B1 8/2012 Chen et al.
8,285,830 B1 * 10/2012 Stout ................... H04L 63/1441
709/224
8,316,440 B1 * 11/2012 Hsieh .................. H04L 63/1483
713/168
8,555,388 B1 10/2013 Wang et al.
8,561,188 B1 10/2013 Wang et al.
8,677,487 B2 3/2014 Balupari et al.
(Continued)

FOREIGN PATENT DOCUMENTS

CN 114077741 A 2/2022
JP 2008243034 A 10/2008
(Continued)

OTHER PUBLICATIONS

Palo Alto Networks, "CORTEX XSOAR—Phishing Investigation—Generic v2," pp. 1-6, year 2020, as downloaded from https://web.archive.org/web/20200927223050/https://xsoar.pan.dev/docs/reference/playbooks/phishing-investigation-generic-v2.
(Continued)

*Primary Examiner* — Khalid M Almaghayreh
(74) *Attorney, Agent, or Firm* — Meitar Patents Ltd.; Daniel Kligler

(57) ABSTRACT

Methods, storage systems and computer program products implement embodiments of the present invention that include identifying a first autonomous system number (ASN) for a service hosted by a networked entity, and retrieving, from a log file, an entry corresponding to an access by a networked entity to the service and including an Internet Protocol (IP) address of the networked entity and an access token authorizing access to the service. A second ASN for the IP address is identified, and the second ASN is compared to the first ASN. Finally, an alert is generated for the access upon detecting the first ASN differing from the second ASN.

7 Claims, 5 Drawing Sheets

(56) References Cited

U.S. PATENT DOCUMENTS

| | | | |
|---|---|---|---|
| 8,713,674 B1* | 4/2014 | Geide | G06F 21/552 |
| | | | 726/25 |
| 8,826,434 B2 | 9/2014 | Merza | |
| 8,893,286 B1 | 11/2014 | Oliver | |
| 8,955,114 B2 | 2/2015 | Dolan-Gavitt et al. | |
| 8,966,625 B1 | 2/2015 | Zuk et al. | |
| 9,038,178 B1 | 5/2015 | Lin et al. | |
| 9,130,982 B2 | 9/2015 | Gottlieb et al. | |
| 9,147,071 B2 | 9/2015 | Sallam | |
| 9,154,516 B1 | 10/2015 | Vaystikh et al. | |
| 9,215,239 B1 | 12/2015 | Wang et al. | |
| 9,342,691 B2 | 5/2016 | Maestas | |
| 9,378,361 B1 | 6/2016 | Yen et al. | |
| 9,386,028 B2 | 7/2016 | Altman | |
| 9,462,008 B2 | 10/2016 | Bartos et al. | |
| 9,998,484 B1 | 6/2018 | Buyukkayhan et al. | |
| 10,148,690 B2 | 12/2018 | Shen et al. | |
| 10,257,295 B1 | 4/2019 | Alpert et al. | |
| 10,425,436 B2 | 9/2019 | Firstenberg et al. | |
| 10,574,681 B2 | 2/2020 | Meshi et al. | |
| 10,587,647 B1 | 3/2020 | Khalid et al. | |
| 10,601,866 B2 | 3/2020 | Bartik et al. | |
| 10,623,446 B1* | 4/2020 | Stoler | H04L 63/101 |
| 11,457,040 B1* | 9/2022 | Sole | H04L 63/101 |
| 11,516,232 B1* | 11/2022 | Sumpter | H04L 63/20 |
| 2003/0105980 A1 | 6/2003 | Challener et al. | |
| 2003/0110379 A1 | 6/2003 | Ylonen et al. | |
| 2006/0200487 A1* | 9/2006 | Adelman | H04L 65/1079 |
| | | | 707/999.102 |
| 2007/0064617 A1 | 3/2007 | Reves | |
| 2007/0143852 A1 | 6/2007 | Keanini et al. | |
| 2008/0034425 A1 | 2/2008 | Overcash et al. | |
| 2008/0060054 A1* | 3/2008 | Srivastava | H04L 63/14 |
| | | | 726/2 |
| 2008/0082662 A1 | 4/2008 | Dandliker et al. | |
| 2008/0256622 A1 | 10/2008 | Neystadt et al. | |
| 2009/0119397 A1 | 5/2009 | Needaels | |
| 2010/0042622 A1* | 2/2010 | Matkowsky | G06Q 10/00 |
| | | | 707/E17.135 |
| 2010/0235915 A1* | 9/2010 | Memon | H04L 63/145 |
| | | | 709/224 |
| 2011/0016525 A1 | 1/2011 | Jeong et al. | |
| 2011/0066624 A1 | 3/2011 | Turakhia | |
| 2011/0185429 A1 | 7/2011 | Sallam | |
| 2011/0239300 A1 | 9/2011 | Klein et al. | |
| 2011/0283357 A1 | 11/2011 | Pandrangi et al. | |
| 2011/0302656 A1 | 12/2011 | El-Moussa | |
| 2012/0158626 A1 | 6/2012 | Zhu et al. | |
| 2013/0007233 A1 | 1/2013 | Lv et al. | |
| 2013/0031625 A1 | 1/2013 | Lim | |
| 2014/0007238 A1 | 1/2014 | Magee et al. | |
| 2014/0165207 A1 | 6/2014 | Engel et al. | |
| 2014/0181973 A1 | 6/2014 | Lee et al. | |
| 2015/0128263 A1 | 5/2015 | Raugas et al. | |
| 2015/0149530 A1* | 5/2015 | Maret | H04L 67/563 |
| | | | 709/203 |
| 2015/0170072 A1 | 6/2015 | Grant et al. | |
| 2015/0172300 A1 | 6/2015 | Cochenour | |
| 2015/0195299 A1* | 7/2015 | Zoldi | H04L 63/1408 |
| | | | 726/25 |
| 2015/0358344 A1 | 12/2015 | Mumcuoglu et al. | |
| 2015/0365437 A1 | 12/2015 | Bell, Jr. et al. | |
| 2015/0373039 A1 | 12/2015 | Wang | |
| 2015/0373043 A1 | 12/2015 | Wang et al. | |
| 2016/0042287 A1 | 2/2016 | Eldardiry et al. | |
| 2016/0057165 A1 | 2/2016 | Thakar et al. | |
| 2016/0099072 A1 | 4/2016 | Cook et al. | |
| 2016/0104203 A1 | 4/2016 | Roosenraad et al. | |
| 2016/0134651 A1 | 5/2016 | Hu et al. | |
| 2016/0150004 A1* | 5/2016 | Hentunen | H04L 63/1433 |
| | | | 726/23 |
| 2016/0156655 A1 | 6/2016 | Lotem et al. | |
| 2016/0234167 A1 | 8/2016 | Engel et al. | |
| 2016/0294773 A1 | 10/2016 | Yu et al. | |
| 2016/0352772 A1 | 12/2016 | O'Connor | |
| 2016/0366159 A1* | 12/2016 | Chiba | H04L 63/1458 |
| 2017/0026398 A1 | 1/2017 | Mumcuoglu et al. | |
| 2017/0041333 A1* | 2/2017 | Mahjoub | H04L 43/0876 |
| 2017/0063885 A1* | 3/2017 | Wardman | H04L 63/1416 |
| 2017/0098086 A1 | 4/2017 | Hoernecke et al. | |
| 2017/0111338 A1* | 4/2017 | Malatesha | H04L 67/1097 |
| 2017/0123875 A1 | 5/2017 | Craik et al. | |
| 2017/0126718 A1 | 5/2017 | Baradaran et al. | |
| 2017/0149807 A1 | 5/2017 | Schilling et al. | |
| 2017/0244745 A1 | 8/2017 | Key et al. | |
| 2017/0323548 A1 | 11/2017 | Glatfelter et al. | |
| 2018/0013778 A1 | 1/2018 | Lim et al. | |
| 2018/0054449 A1 | 2/2018 | Nandha et al. | |
| 2018/0063174 A1* | 3/2018 | Grill | H04L 63/0236 |
| 2018/0069884 A1* | 3/2018 | Firstenberg | H04L 43/12 |
| 2018/0139224 A1 | 5/2018 | Amell et al. | |
| 2018/0285567 A1 | 10/2018 | Raman | |
| 2018/0288073 A1 | 10/2018 | Hopper | |
| 2018/0351930 A1 | 12/2018 | Kim et al. | |
| 2019/0007440 A1 | 1/2019 | Lavi et al. | |
| 2019/0058724 A1 | 2/2019 | Kraning et al. | |
| 2019/0068575 A1* | 2/2019 | Vongsouvanh | H04W 12/06 |
| 2019/0068624 A1* | 2/2019 | Compton | H04L 63/1441 |
| 2019/0068638 A1 | 2/2019 | Bartik et al. | |
| 2019/0081952 A1 | 3/2019 | Wood | |
| 2019/0190931 A1 | 6/2019 | Levin et al. | |
| 2019/0250911 A1 | 8/2019 | Lospinuso et al. | |
| 2019/0297097 A1 | 9/2019 | Gong et al. | |
| 2019/0319977 A1 | 10/2019 | Gottschlich et al. | |
| 2019/0319981 A1 | 10/2019 | Meshi et al. | |
| 2019/0372934 A1 | 12/2019 | Yehudai et al. | |
| 2019/0387005 A1 | 12/2019 | Zawoad et al. | |
| 2020/0007548 A1 | 1/2020 | Sanghavi et al. | |
| 2020/0014714 A1 | 1/2020 | Mortensen et al. | |
| 2020/0067913 A1* | 2/2020 | Kapoor | H04L 63/0876 |
| 2020/0177625 A1 | 6/2020 | Rouvinen | |
| 2020/0213333 A1 | 7/2020 | Deutschmann et al. | |
| 2020/0233791 A1 | 7/2020 | Manzano et al. | |
| 2020/0244658 A1 | 7/2020 | Meshi et al. | |
| 2020/0364354 A1* | 11/2020 | Schwartz | G06F 21/44 |
| 2020/0412717 A1* | 12/2020 | Puertas Calvo | H04L 63/08 |
| 2021/0014198 A1 | 1/2021 | Amoudi et al. | |
| 2021/0136037 A1 | 5/2021 | Balasubramaniam | |
| 2021/0258325 A1 | 8/2021 | Meyer et al. | |
| 2021/0266331 A1 | 8/2021 | Meshi et al. | |
| 2021/0289371 A1 | 9/2021 | Bagwell | |
| 2022/0006819 A1 | 1/2022 | Allon et al. | |
| 2022/0070216 A1 | 3/2022 | Kohavi | |
| 2022/0342976 A1* | 10/2022 | Stoyanov | H04L 63/0807 |
| 2022/0353284 A1* | 11/2022 | Vörös | H04L 63/1441 |
| 2022/0385694 A1 | 12/2022 | Zverkov et al. | |
| 2023/0086281 A1* | 3/2023 | Kaidi | H04L 63/20 |
| | | | 726/22 |
| 2023/0093904 A1* | 3/2023 | Konda | H04L 63/1425 |
| | | | 726/13 |
| 2023/0118679 A1 | 4/2023 | Mayer et al. | |
| 2023/0403265 A1* | 12/2023 | Gaffney | H04L 63/101 |
| 2024/0015176 A1 | 1/2024 | Egbert et al. | |

FOREIGN PATENT DOCUMENTS

| | | |
|---|---|---|
| WO | 2012167056 A2 | 12/2012 |
| WO | 2020148934 A1 | 7/2020 |

OTHER PUBLICATIONS

Github, cburgmer/rasterizeHTML.js, pp. 1-2, Jan. 19, 2020, as downloaded from https://web.archive.org/web/20200219074432/https://github.com/cburgmer/rasterizeHTML.js.

REFSNES Data, "W3Schools,—HTML <form> Tag," pp. 1-10, years 1999-2023, as downloaded from https://www.w3schools.com/tags/tag_form.asp.

REFSNES Data, "W3Schools,—HTML <input> Tag," pp. 1-11, years 1999-2023, as downloaded from https://www.w3schools.com/tags/tag_input.asp.

(56) References Cited

OTHER PUBLICATIONS

Microsoft 365, "Exchange—Work Smarter with Business-Class Email and Calendaring," pp. 1-4, Aug. 15, 2020, as downloaded from https://web.archive.org/web/20200815211502/https://www.microsoft.com/en-ww/microsoft-365/exchange/email.
Wikipedia, "Selenium (Software)," pp. 1-5, last edited Dec. 3, 2019, as downloaded from https://web.archive.org/web/20191218132058/https://en.wikipedia.org/wiki/Selenium_(software).
Wikipedia, "Whois," pp. 1-16, last edited Dec. 23, 2019, as downloaded from https://web.archive.org/web/20200112181104/https://en.wikipedia.org/wiki/WHOIS.
"British National Corpus," Oxford Text Archive, IT Services, University of Oxford, p. 1-1, year 2015, as downloaded from https://web.archive.org/web/20200128044646/http://www.natcorp.ox.ac.uk/.
International Applicaton PCT/IB2023/056071 Search Report dated Sep. 22, 2023.
Alon, "Compromised Cloud Compute Credentials: Case Studies from the Wild," Unit 42, Palo Alto Networks, Inc., bages 1-14, Dec. 8, 2022, as downloaded from as downloaded from https://unit42.paloaltonetworks.com/compromised-cloud-compute-credentials/.
JP Application # 2024504256 Office Action dated Jul. 2, 2024.
U.S. Appl. No. 16/798,466 Office Action dated Jan. 19, 2023.
Wei et al., "Identifying New Spam Domains by Hosting IPS: Improving Domain Blacklisting", Dept. of Computer and Information Sciences, University of Alabama at Birmingham, pp. 1-8, Jan. 2010.
IANA., "Autonomous System (AS) Numbers", 1 page, Jul. 29, 2016.
Gross et al., "FIRE: FInding Rogue nEtworks", Annual Conference on Computer Security Applications, pp. 1-10, Dec. 7-11, 2009.
Frosch., "Mining DNS-related Data for Suspicious Features", Ruhr Universitat Bochum, Master's Thesis, pp. 1-88, Dec. 23, 2011.
Bilge et at., "DISCLOSURE: Detecting Botnet Command and Control Servers Through Large-Scale NetFlow Analysis", Annual Conference on Computer Security Applications, pp. 1-10, Dec. 3-7, 2012.
Blum., "Combining Labeled and Unlabeled Data with Co-Training", Carnegie Mellon University, Research Showcase @ CMU, Computer Science Department, pp. 1-11, Jul. 1998.
Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.
Konte et al., "ASwatch: An AS Reputation System to Expose Bulletproof Hosting ASes", SIGCOMM , pp. 625-638, Aug. 17-21, 2015.
Markowitz, N., "Bullet Proof Hosting: A Theoretical Model", Security Week, pp. 1-5 ,Jun. 29, 2010, downloaded from http://www.infosecisland.com/blogview/4487-Bullet-Proof-Hosting-A-Theoretical-Model.html.
Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.
Goncharov, M., "Criminal Hideouts for Lease: Bulletproof Hosting Services", Forward-Looking Threat Research (FTR) Team, A TrendLabsSM Research Paper, pp. 1-28, Jul. 3, 2015.
BILGE at al., "EXPOSURE: Finding Malicious Domains Using Passive DNS Analysis ", NDSS Symposium, pp. 1-17 Feb. 6-9, 2011.
Xu et al., "We know it before you do: Predicting Malicious Domains", Virus Bulletin Conference, pp. 73-33, Sep. 2014.
Palo Alto Networks, "Cortex XDR", p. 1-7, year 2020.
U.S. Appl. No. 16/798,466 Office Action dated May 11, 2022.
"GeoIP Databases & Services: Industry Leading IP Intelligence," MaxMind, Inc., pp. 1-3, updated Jan. 14, 2022, as downloaded from https://www.maxmind.com/en/geoip2-services-and-databases.
U.S. Appl. No. 16/789,442 Office Action dated Aug. 18, 2022.
U.S. Appl. No. 16/798,466 Office Action dated Aug. 25, 2022.
Mandiant, "Highly Evasive Attacker Leverages SolarWinds Supply Chain to Compromise Multiple Global Victims with SUNBURST Backdoor", pp. 1-16, Dec. 13, 2020 downloaded from https://www.mandiant.com/resources/blog/evasive-attacker-leverages-solarwinds-supply-chain-compromises-with-sunburst-backdoor.
U.S. Appl. No. 17/857,196 Office Action dated Dec. 7, 2023.
U.S. Appl. No. 18/353,115 Office Action dated May 1, 2024.
JP Application # 2024504256 Office Action dated Oct. 8, 2024.
US Application # U.S. Appl. No. 17/844,097 Office Action dated Nov. 19, 2024.
U.S. Appl. No. 18/591,004 Office Action dated Dec. 3, 2024.
JP Application # 2024504256 Office Action dated Jan. 28, 2025.
Alsariera et al., "AI Meta-learners and Extra-trees Algorithm for the Detection of Phishing Websites," IEEE Access, pp. 142532-145242, Aug. 14, 2020.
U.S. Appl. No. 18/295,857 Office Action Mar. 17, 2025.
U.S. Appl. No. 18/591,004 Office Action dated Apr. 7, 2025.
Final U.S. Office Action U.S. Appl. No. 18/475,266, dated Aug. 15, 2025.

* cited by examiner

DETECTING CREDENTIALS ABUSE OF CLOUD COMPUTE SERVICES

FIELD OF THE INVENTION

The present invention relates generally to computer security and networks, and particularly to preventing cyberattacks on network services by detecting unauthorized use of access tokens.

BACKGROUND OF THE INVENTION

Authentication and authorization are two critical concepts in access control. Authentication is essentially verifying the identity of an entity (e.g., a user or a computing resource such as a physical computers, virtual machines, and cloud-based resources and services). Authentication enables access control by proving that an entity's credentials match those in a database, thereby ensuring system security, process security, and corporate information security.

Authorization typically occurs after a system has successfully authenticated the identity of an entity. An authorization system will then allow access to resources such as information, files, databases, or specific operations and capabilities. After a system authenticates a user, the authorization system verifies access to the required resources. Authorization is the process of determining whether an authenticated user can access a particular resource or perform a specific action. For example, after a file server authorizes a user, the file server can determine which files or directories that can be read, written, or deleted.

Some systems implement token-based authorization via the use of access tokens. Access tokens are used in token-based authentication to allow an application to access a service (e.g., a storage service). An entity receives an access token after a being successfully authenticated. Upon receiving the access token, the entity can convey the access token as a credential when it conveys a request (e.g., an API call) to the service. The conveyed token informs the service that the bearer of the token has been authorized to access the service and perform specific actions specified by the scope that was granted during authorization.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method, including identifying determining a first autonomous system number (ASN) for a service hosted by a networked entity, retrieving, from a log file, an entry corresponding to an access by a networked entity to the service and including an Internet Protocol (IP) address of the networked entity and an access token authorizing access to the service, detecting, by a processor, an access token conveyed from an Internet Protocol (IP) address to the service, identifying determining a second ASN for the IP address, comparing, by a processor, the second ASN to the first ASN, and generating an alert for the access upon detecting the first ASN differing from the second ASN.

In one embodiment the method further includes determining a first organization for the first ASN, and determining a second organization for the second ASN.

In some embodiments, the generated alert includes a first alert upon determining that the first organization matches the second organization, the generated alert includes a second alert upon determining that the first organization does not match the second organization, and the second alert indicates a greater threat than the first alert.

In another embodiment, the service hosted by the networked entity includes a first service hosted by a first networked entity and the method includes assigning, by a second service hosted by a second networked entity, the access token to a resource having the IP address belonging to the first ASN.

In a first resource embodiment, the resource includes a physical computing device.

In a second resource embodiment, the resource includes virtual machine.

In a third resource embodiment, the resource includes a cloud service.

In a first networked entity embodiment, the networked entity includes a virtual machine.

In a second networked entity embodiment, the networked entity includes a physical computing device.

In a third networked entity embodiment, the networked entity includes a cloud service.

There is also provided, in accordance with an embodiment of the present invention, an apparatus, including a network interface controller (NIC), and one or more processors configured to identify a first autonomous system number (ASN) for a service hosted by a networked entity, to retrieve, from a log file via the NIC, an entry corresponding to an access by a networked entity to the service and including an Internet Protocol (IP) address of the networked entity and an access token authorizing access to the service, to identify a second ASN for the IP address, to compare the second ASN to the first ASN, and to generate an alert for the access upon detecting the first ASN differing from the second ASN.

There is additionally provided, in accordance with an embodiment of the present invention, a computer software product, the product including a non-transitory computer-readable medium, in which program instructions are stored, which instructions, when read by a computer, cause the computer to identify a first autonomous system number (ASN) for a service hosted by a networked entity, to retrieve, from a log file, an entry corresponding to an access by a networked entity to the service and including an Internet Protocol (IP) address of the networked entity and an access token authorizing access to the service, to identify a second ASN for the IP address, to compare the second ASN to the first ASN, and to generate an alert for the access upon detecting the first ASN differing from the second ASN.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide methods and systems for recommending detecting use of stolen credentials. In embodiments described herein, the credentials may comprise an access token, and the abuse comprises may comprise unauthorized use of the access token 24 for exfiltrating sensitive data. As described hereinbelow, an autonomous system number (ASN) is identified for a service (e.g., a storage service) hosted by a networked entity, and an access to the service can be detected by retrieving, from a log file, an entry corresponding to the access by a networked entity to the service and comprising an Internet Protocol (IP) address of the networked entity and an access token authorizing access to the service. A second ASN is identified for the IP address, and upon comparing the second ASN to the first ASN, an alert is generated for the access upon detecting the first ASN differing from the second ASN.

In embodiments described hereinbelow, an organization may use managed cloud service to provide resources that can use access tokens to access data stored on a storage service also managed by the cloud service. Since the IP addresses of the resources and the services typically belong to the same ASN, security systems implementing embodiments of the present invention can be used to detect a cyberattack in which a computer, having an IP address belonging to a different ASN, attempts to use an access token (i.e., that was assigned to a given resource) to gain access to the data in the storage service.

System Description

Figure 1:
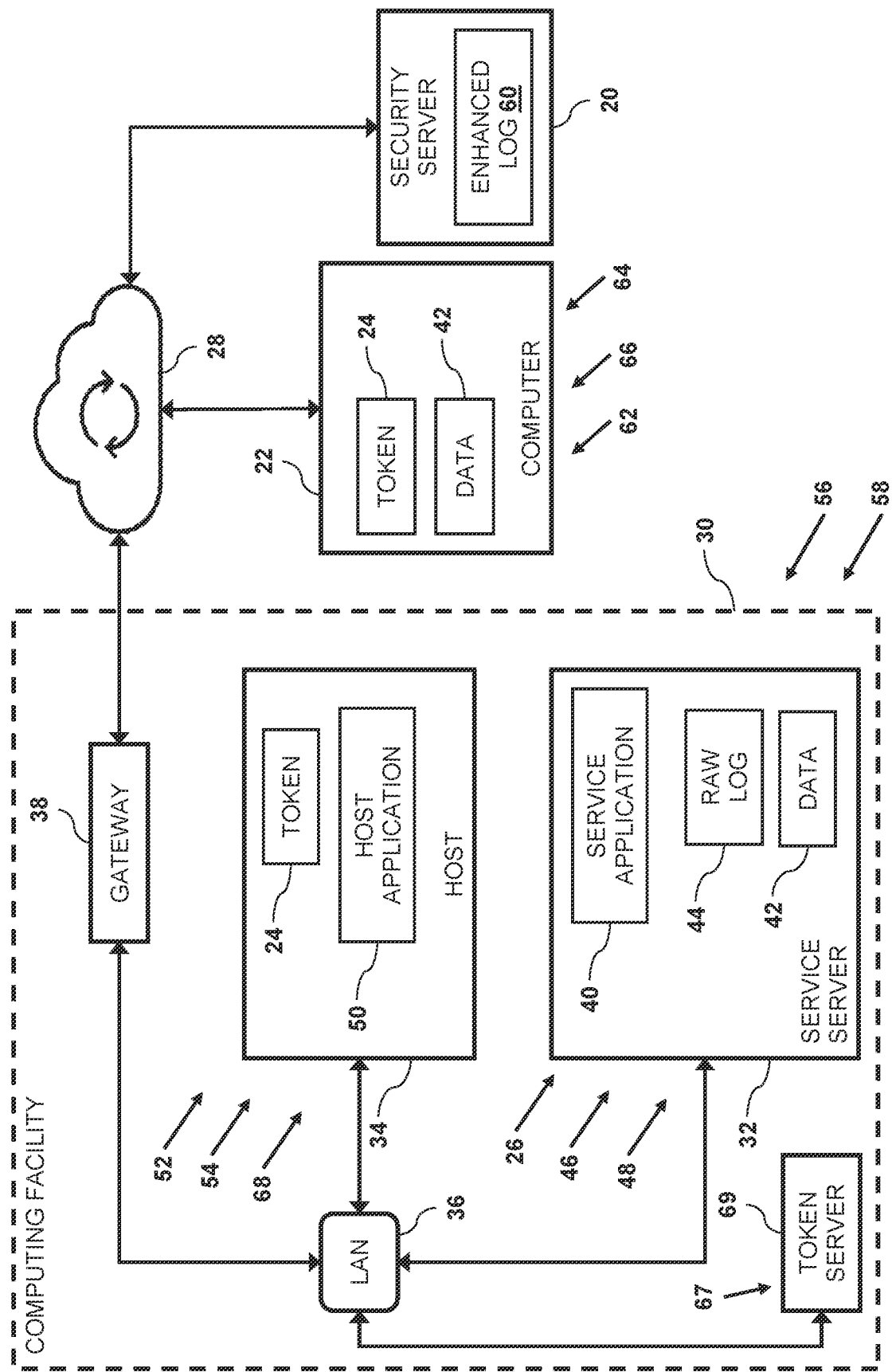
FIG. 1 is a block diagram that shows an example of a security server that can detect abused authorization credentials used to launch a cyberattack on a service hosted in a computing facility, in accordance with a first embodiment of the present invention.

FIG. 1 is a block diagram that schematically shows an example of a security server 20 that can detect a networked entity (e.g., computer 22) using a stolen access token 24 to access a service 26 via a public network 28 such as the Internet, in accordance with a first embodiment of the present invention.

In the configuration shown in FIG. 1, a computing facility 30 comprises a service server 32 and a host computer 34 that can communicate over a local area network (LAN) 36, and a gateway 38 that couples local area network 36 to Internet 28. Computer 22 is external to computing facility 30, and may be referred to herein as external computer 22.

Service server 32 can execute a service application 40 so as to provide service 26. For example, service application 40 may comprise a storage service that manages data 42 stored in data facility 30.

In some embodiments, server 32 comprises a raw event log 44 that stores details of accesses to service 26. Raw event log 44 is described in the description referencing FIG. 2 hereinbelow.

Server 32 also has a server IP address 46, and service 26 has a service identifier (ID) 48. While the configuration of computing facility 30 in FIG. 1 shows a single server 32 providing a single service 26, there may be instances when the computing facility comprises multiple servers 32 (comprising respective IP addresses 46) providing respective services 26 having corresponding unique service IDs 48. For example, computing facility 30 may comprise multiple servers 32 providing respective storage services 26, and the storage services can have corresponding service IDs 48 such as Storage1, Storage2 . . . StorageN.

Host computer 34 stores access token 24, and executes a host application 50 that is configured to access service 26 by conveying the access token to server application 40. Host computer 34 has a host IP address 52 and provides (i.e., to computing facility 30) a resource 68 referenced by a resource ID 54.

While the configuration of computing facility 30 in FIG. 1 shows a host computer 34 accessing a single service 26, there may be instances when the computing facility comprises multiple host computers 34 accessing one or more services 24. In these instances, host computers 34 (comprising respective IP addresses 62) provide respective resources 68 having corresponding unique resource IDs 54.

Computing facility 30 has a facility organization ID 56, and a facility autonomous system number (ASN) 58. The organization ID can reference an organization (e.g., a corporation) that stores corporate data 42 in computing facility 30. ASN 58 typically references a company that has ownership of a specific IP address range that include IP addresses 46 and 52.

In embodiments herein, security server 20 also comprises an enhanced event log 60 that is described in the description referencing FIG. 3 hereinbelow.

In some embodiments, as described hereinbelow, a cyberattack may comprise external computer accessing host application 50 and exfiltrating access token 24, and then using the exfiltrated access token to access server application 40 so as to exfiltrate data 42. The configuration in FIG. 1 shows external computer comprising (i.e., storing) exfiltrated token 24 and exfiltrated data 42.

External computer 20 has an external IP address 62, an external organization ID 64 and an external ASN 66. In one embodiment, as described hereinbelow, organization ID 64 may match organization ID 56. In another embodiment, organization IDs 56 and 64 may differ.

Computing facility 30 may also comprise a token service 67 provided (i.e., hosted) by a token server 69. In some embodiments, token service 67 can provide access token 24 to an authorized networked entity such as host computer 34.

Figure 2:
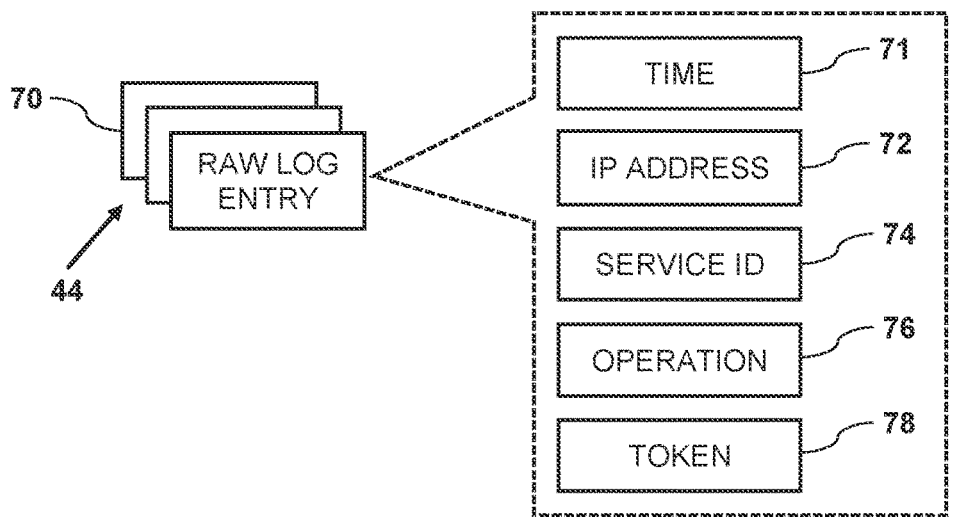
FIG. 2 is a block diagram showing an example of a raw event log storing information on accesses to the service, in accordance with an embodiment of the present invention.

FIG. 2 is a block diagram showing an example of raw event log 44, in accordance with an embodiment of the present invention. In the configuration shown in FIG. 2, raw event log 44 comprises a set of raw event log entries 70. In some embodiments, each log entry 70 corresponds to a given access to a given service 26 (as described supra, computing facility 30 may host multiple services 26), and stores, for each given access, information such as:

- A time 71 indicating a date and a time of the given access.
- An IP address 72 comprising the IP address (e.g., IP address 52 or IP address 62) of a given networked entity (e.g., computer 22) that accessed service 26.
- A service ID 74 referencing a given service 26 that was used in the given access.
- An operation 76 performed in the given access. For example, if service ID 74 represents a given storage service 26, then operation 76 can summarize what (e.g., a data read or a data write) was requested in the given access.

A token 78 comprising (or referencing) a given token 24 used in the given access.

For purposes of simplicity, the configuration in FIG. 1 shows server 32 storing raw event log 44. In embodiments where computing facility comprises multiple service servers 32 hosting multiple services 26, computing facility may comprise a log server (not shown) that stores log 44, and log entries 70 store information for all accesses to all services 26.

Figure 3:
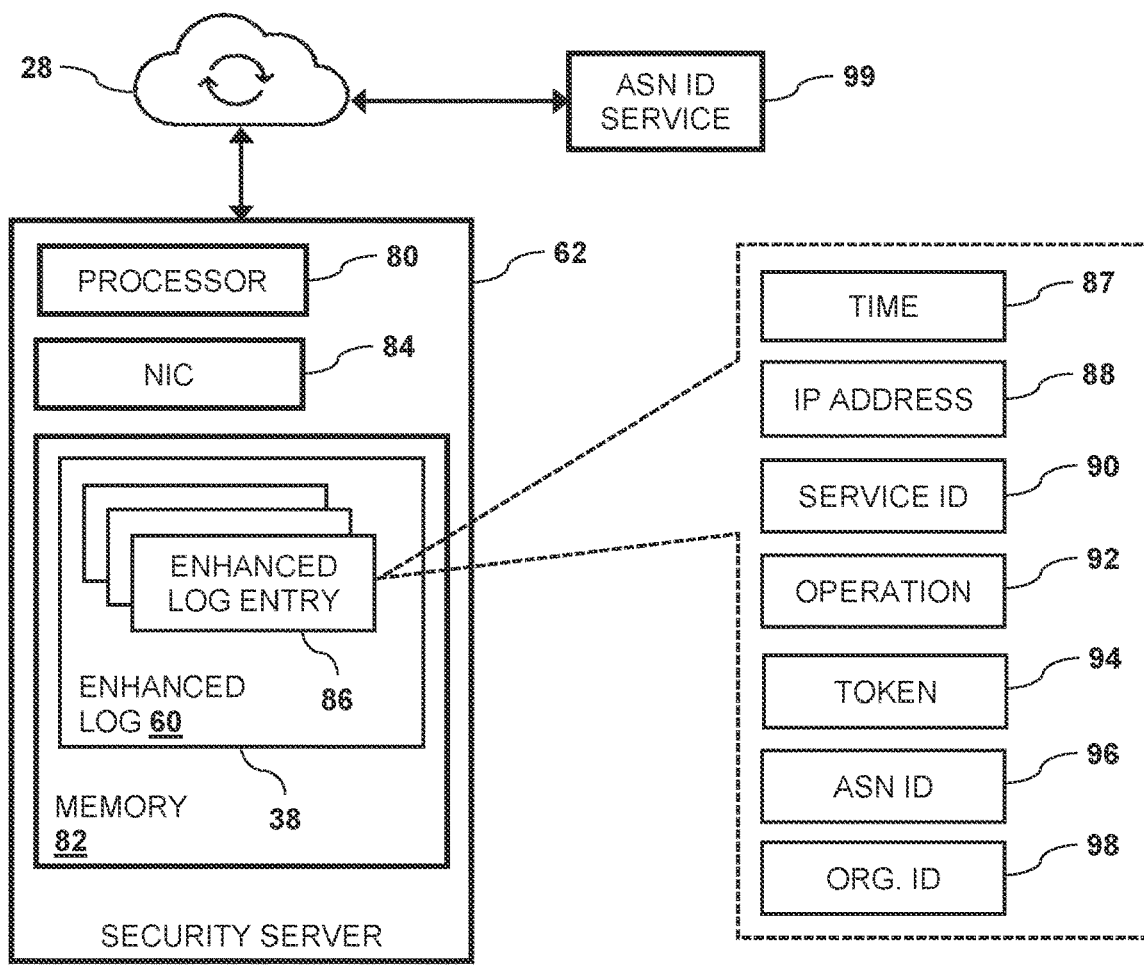
FIG. 3 is a block diagram showing an example configuration of the security server, in accordance with an embodiment of the present invention.

FIG. 3 is a block diagram showing an example configuration security server 20, in accordance with an embodiment of the present invention. In the configuration shown in FIG. 3, security server 20 comprises a security processor 80, a security memory 82 storing enhanced event log 60, and a network interface card (NIC) 84 that couples the security server to Internet 28, thereby enabling communication with server 32.

In some embodiments, log 60 may comprise a set of enhanced log entries 86 having a one-to-one correspondence with log entries 70. Each log entry 86 can stores information such as:

- A time 87. Processor 80 can store time 71 from the corresponding log entry 70 to time 87.
- An IP address 88. Processor 80 can store IP address 72 from the corresponding log entry 70 to IP address 88.
- A service ID 90. Processor 80 can store service ID 74 from the corresponding log entry 70 to service ID 90.
- An operation 92. Processor 80 can store operation 76 from the corresponding log entry 70 to operation 92.
- A token 94. Processor 80 can store token 78 from the corresponding log entry 70 to token 94.
- ASN ID 96. In some embodiments, processor 80 can convey, to an ASN ID service 99 via Internet 28, a request comprising IP address 88, and receive a response (i.e., from the ASN ID service in response to the request) comprising ASN ID 96. One example of ASN ID service 99 is GEOIP™ (provided by MAX-MIND INC., 410 Terry Avenue North Seattle, WA 98109 USA).
- An organization ID 98. There are instances when organizations have multiple ASN IDs 96. Processor 80 can convey, to ASN ID service 99 via Internet 28, a request comprising IP address 88, and receive a response (i.e., from the ASN ID service in response to the request) comprising organization ID 98.

Figure 4A:
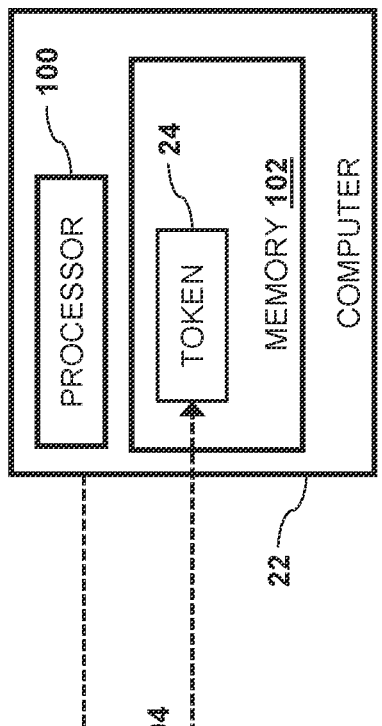
FIGS. 4A and 4B, referred to collectively herein as FIG. 4, are block diagrams schematically illustrating the cyberattack, in accordance with the first embodiment of the present invention.
Figure 4A:
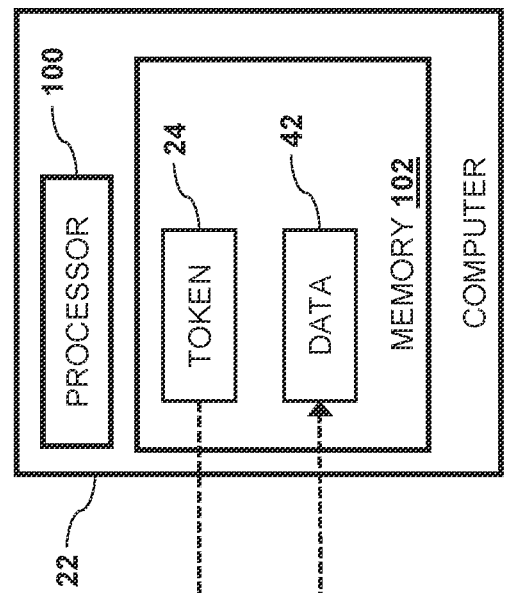
Figure 4B:
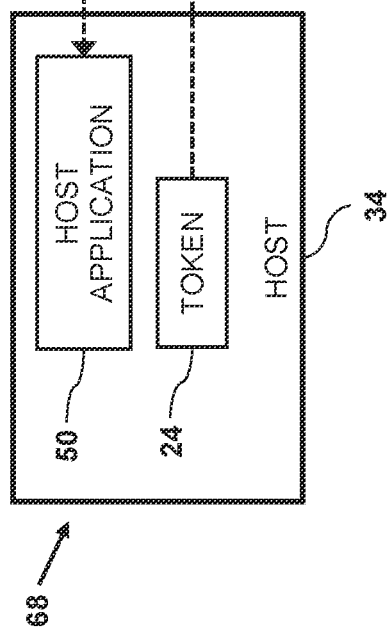
Figure 4B:
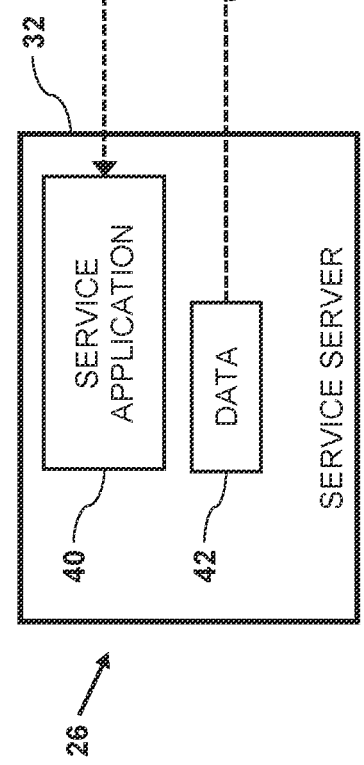

FIGS. 4A and 4B, referred to collectively herein as FIG. 4, are block diagrams schematically illustrating an example of a server-side request forgery (SSRF) cyberattack that can be detected by security server 20, in accordance with the first embodiment of the present invention. In the configuration shown in FIG. 4, external computer 22 comprises an external processor 100 and an external memory 102.

As shown in FIG. 4A, processor 100 launches the cyberattack by conveying, to resource 68 (provided by host application 50) a transmission 104 (typically comprising data packets such as TCP/IP packets) that includes malicious instructions (not shown). In response to receiving and executing the received malicious instructions, host 34 conveys, to computer 22, a transmission 106 comprising token 24, which processor 100 stores to memory 102.

As shown in FIG. 4B, processor 100 continues the cyberattack by conveying, to service 26 (provided by service application 40), a transmission 108 comprising token 24. Upon receiving (and validating) token 24, service 26 grants computer 22 access to data 42. Upon being granted access, processor 100 can exfiltrate data 42 via one or more transmissions 110 (i.e., from server 32 to computer 22), and store the exfiltrated data to memory 102.

Processors 80 and 100 comprise general-purpose central processing units (CPU) or special-purpose embedded processors, which are programmed in software or firmware to carry out the functions described herein. This software may be downloaded to code server security server 20 or external computer 22 in electronic form, over a network, for example. Additionally or alternatively, the software may be stored on tangible, non-transitory computer-readable media, such as optical, magnetic, or electronic memory media. Further additionally or alternatively, at least some of the functions of processors 80 and 100 may be carried out by hard-wired or programmable digital logic circuits.

Examples of memories 82 and 102 include dynamic random-access memories, non-volatile random-access memories, hard disk drives and solid-state disk drives.

In some embodiments, tasks described herein performed by host(s) 34, server(s) 32, security server 22 and token server 69 may be split among multiple physical and/or virtual computing devices such as physical server and/or virtual server. In other embodiments, these tasks may be performed by a managed cloud service such as AMAZON WEB SERVICES™ (also known as AWS™, provided by AMAZON.COM, INC., 51 Pleasant Street #1020. Malden, MA 02148. USA).

Figure 5A:
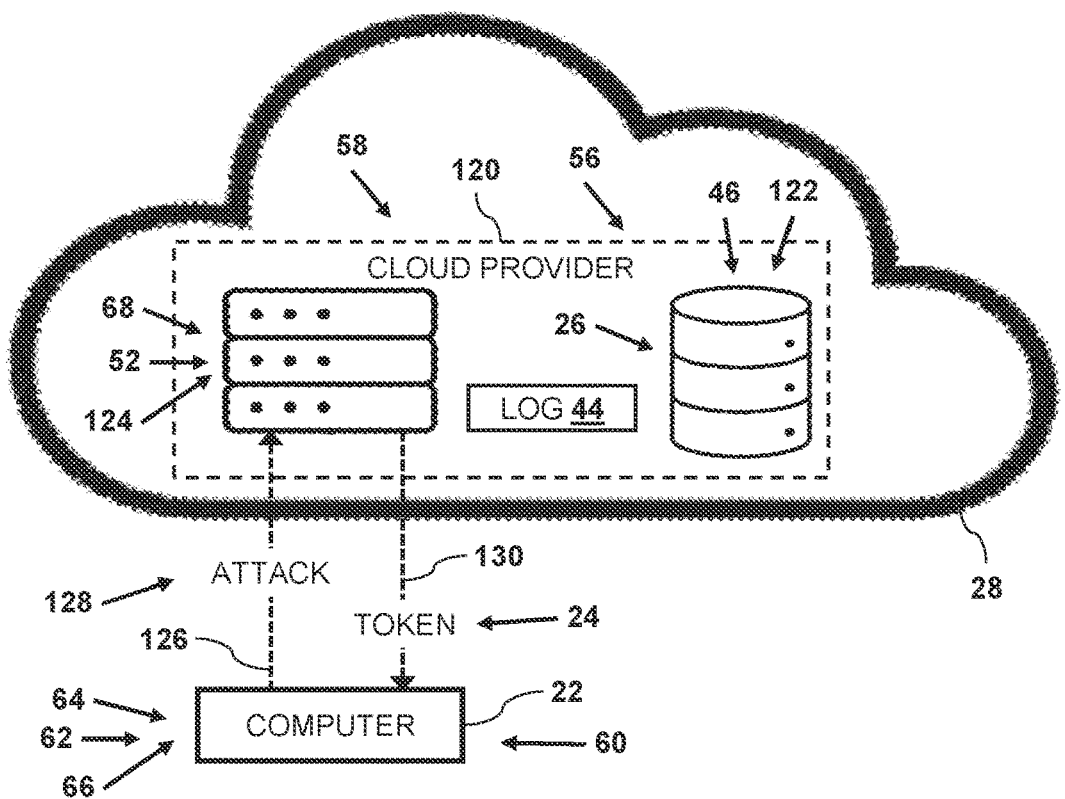
FIGS. 5A and 5B, referred to collectively herein as FIG. 2, are block diagrams schematically illustrating a cyberattack on the service hosted by a cloud provider, in accordance with a second embodiment of the present invention.
Figure 5B:
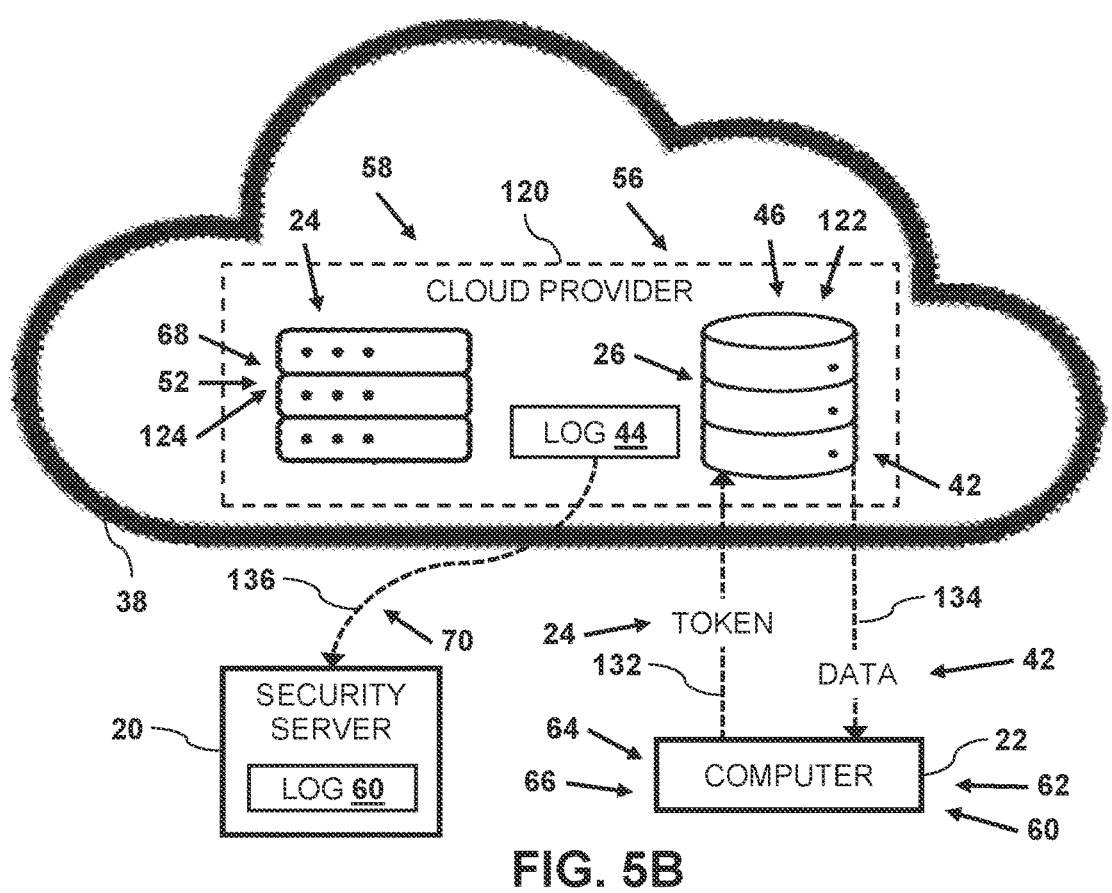

FIGS. 5A and 5B, referred to collectively herein as FIG. 2, are block diagrams schematically illustrating an SSRF cyberattack on service 26 hosted by a managed cloud service 120, in accordance with a second embodiment of the present invention. In the second embodiment, service 26 and resource 68 are respectively implemented in virtual machines (VMs) 122 and 124 that are managed by cloud service 120.

As shown in FIG. 5A, computer 22 launches the cyberattack by conveying, to resource 68 hosted on VM 124, a transmission 126 comprising an attack 128 that includes malicious instructions (not shown). In response to receiving and executing the instructions, VM 124 conveys, to computer 22, a transmission 130 comprising token 24.

As shown in FIG. 4B, computer 22 continues the cyberattack by conveying, to service 26 hosted on VM 122, a transmission 132 comprising token 24. Upon receiving (and validating) token 24, service 26 grants computer 22 access to data 42. Upon being granted access, computer 22 can exfiltrate data 42 via one or more transmissions 134 (i.e., from VM 122 to computer 22).

In embodiments described herein, security server 20 can detect the cyberattack by retrieving, in transmissions 136, new log entries 70 stored to event log 44, store the information in the received raw event log entries to event log 60, and analyze the received information.

In embodiments herein, external computer 22, host computer(s) 34, server(s) 32, server 69, and VMs 122, 124 may be referred to as networked entities. For example, service 26 may be hosted by networked entity 32 or networked entity 122.

Stolen Access Token Detection

Figure 6:
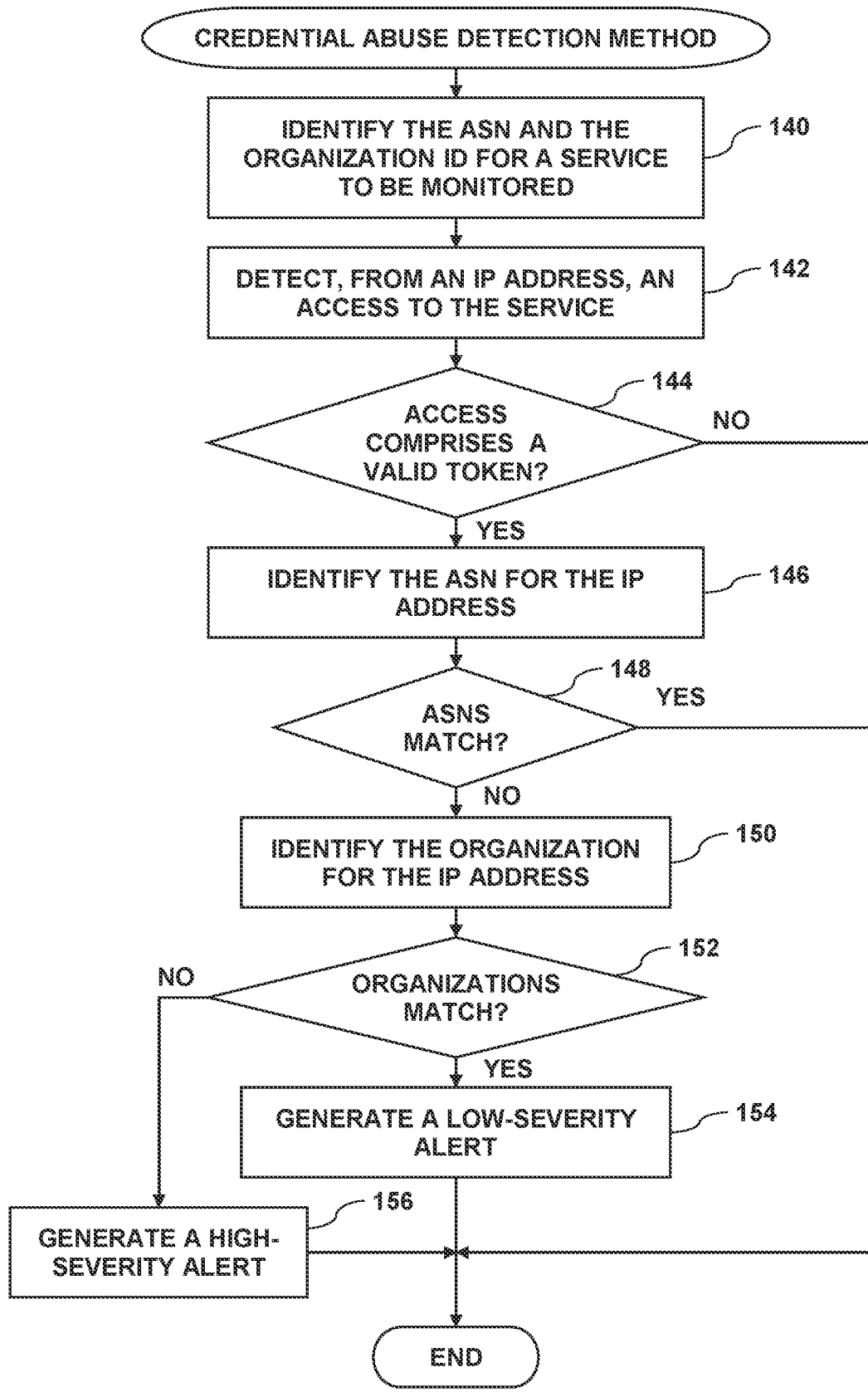
FIG. 6 is a flow diagram that schematically illustrates a method of detecting use of stolen credentials, in accordance with an embodiment of the present invention.

FIG. 6 is a flow diagram that schematically illustrates a method of detecting use of stolen credentials, in accordance with an embodiment of the present invention. In embodiments described herein, the credentials comprise token 24, and the abuse comprises unauthorized use of token 24 so as to exfiltrate data 42.

In step 140, using embodiments described supra, processor 80 identifies ASN 58 and organization ID 56 for (i.e., associated with) a given service 26 (i.e., in computing facility 30 or cloud service 120) to be monitored.

In step 142, processor 80 detects a (new) access, from IP address 62, to service 26 using a given access token 24. In some embodiments the access may comprise service 26 receiving, from a given networked entity (e.g., computer 22 or resource 34), an authorization request comprising access token 24. Upon receiving the authorization request, service 26 can add a new raw log entry 70 to event log 44, populate the new raw log entry (i.e., including, but not limited to, IP address 72 and token 78) using embodiments described hereinabove, and convey the new raw log entry to security server 20. Prior to detecting the authorization request, a token management service (not shown) executing on token server 69 can assign, to the given networked entity, access token 24.

In some embodiments, processor 80 can detect the new access by receiving (i.e., retrieving from raw log 44 via NIC 84), from service 26, a the new raw log entry (i.e., corresponding to the new access). Upon the new raw event log entry, create a new corresponding log entry 86 in enhanced log 60, and populate the new enhanced log entry with information using embodiments described hereinabove.

In step 144, processor 80 analyzes the given access token so as to determine whether or not the given access token is valid. For example, the given token may have an expiration date and time, and processor can check whether or not time 87 is prior to the expiration.

If processor 80 determines that the given access token is valid, then in step 146, the security processor uses embodiments described hereinabove to identify ASN 66 for IP address 62.

In step 148, processor 80 compares ASN 58 to ASN 66. If, based on the comparison, processor 80 detects that ASN 58 does not match ASN 66, then in step 150, the security processor uses embodiments described hereinabove to identify organization ID 64 for (i.e., associated with) IP address 66.

In step 152, processor 80 compares organization ID 56 to organization ID 64. If processor 80 detects, based on the comparison, that organization ID 56 matches organization ID 64, then in step 154 the security processor generates a low-severity alert (i.e., for the new access corresponding to the received new raw log entry), and the method ends. The following are examples of why a low-level alert may be warranted if organization ID 56 matches organization ID 64:

Computer 22 and service 26 (i.e., in the first embodiment described in the description referencing FIG. 4 hereinabove) may belong to the same organization. Even though token 24 was allocated to host computer 34, computer 22 using token 24 may be ill-advised (i.e., from a cybersecurity perspective), but is probably not malicious.

Virtual machines 122 and 124 (i.e., in the second embodiment described in the description referencing FIG. 5 hereinabove) may by provisioned by a single cloud service 120 but have different ASNs. For example, VM 122 may be provisioned by the cloud provider in a first geolocation, having a first IP address 46 belonging to a first ASN 58, and VM 124 may be provisioned by the cloud provider in a second geolocation, having a second IP address 46 belonging to a second ASN 58.

Returning to step 152, if, based on the comparison, processor 80 does not a match between organization ID 56 and organization ID 64, then in step 156, the security processor 80 generates a high-severity alert, and the method ends. In embodiments herein, a high severity alert indicates more suspicious activity (e.g., the given access poses a greater threat) than a low-severity alert (i.e., the alert generated in step 154).

Returning to step 148, if processor 80 detects, based on the comparison, that ASN 58 matches ASN 66, then the method ends (i.e., processor 80 classifies the given access as legitimate).

Returning to step 144, if processor 80 determines that the given access token is not valid, then the method ends. In this case service 26 will not grant access to data 42 upon receiving an invalid token 24.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising, by a processor:
    detecting an access by a networked entity to a service associated with a first autonomous system number (ASN) using an access token that is assigned to entities associated with the first ASN and authorizes access to the service, the networked entity having an Internet Protocol (IP) address;
    determining whether the networked entity is authorized to use the access token by:
        identifying a second ASN for the IP address, and
        comparing the second ASN to the first ASN, wherein if the second ASN differs from the first ASN the networked entity is not authorized to use the access token; and
    generating an alert upon determining that the networked entity is not authorized to use the access token.

2. The method according to claim 1, and further comprising identifying a first organization associated with the first ASN, and a second organization associated with the second ASN.

3. The method according to claim 2, wherein the generated alert comprises a first alert upon determining that the first organization matches the second organization, wherein the generated alert comprises a second alert upon determining that the first organization does not match the second organization, and wherein the second alert indicates a greater threat than the first alert.

4. An apparatus, comprising:
    a network interface controller (NIC); and
    one or more processors configured:
        to detect an access by a networked entity to a service associated with a first autonomous system number (ASN) using an access token that is assigned to entities associated with the first ASN and authorizes access to the service, the networked entity having an Internet Protocol (IP) address,
        to determine whether the networked entity is authorized to use the access token by:
            identifying a second ASN for the IP address, and
            comparing the second ASN to the first ASN, wherein if the second ASN differs from the first ASN the networked entity is not authorized to use the access token; and
        to generate an alert upon determining that the networked entity is not authorized to use the access token.

5. The apparatus according to claim 4, wherein a given processor is further configured to identify a first organization associated with the first ASN, and a second organization associated with the second ASN.

6. The apparatus according to claim 5, wherein the generated alert comprises a first alert upon a given processor determining that the first organization matches the second organization, wherein the generated alert comprises a second alert upon the given processor determining that the first organization does not match the second organization, and wherein the second alert indicates a greater threat than the first alert.

7. A computer software product, the product comprising a non-transitory computer-readable medium, in which program instructions are stored, which instructions, when read by a computer, cause the computer:
- to detect an access by a networked entity to a service associated with a first autonomous system number (ASN) using an access token that is assigned to entities associated with the first ASN and authorizes access to the service, the networked entity having an Internet Protocol (IP) address,
- to determine whether the networked entity is authorized to use the access token by:
  - identifying a second ASN for the IP address, and
  - comparing the second ASN to the first ASN, wherein if the second ASN differs from the first ASN the networked entity is not authorized to use the access token; and
- to generate an alert upon determining that the networked entity is not authorized to use the access token.

* * * * *